Figure 1B:
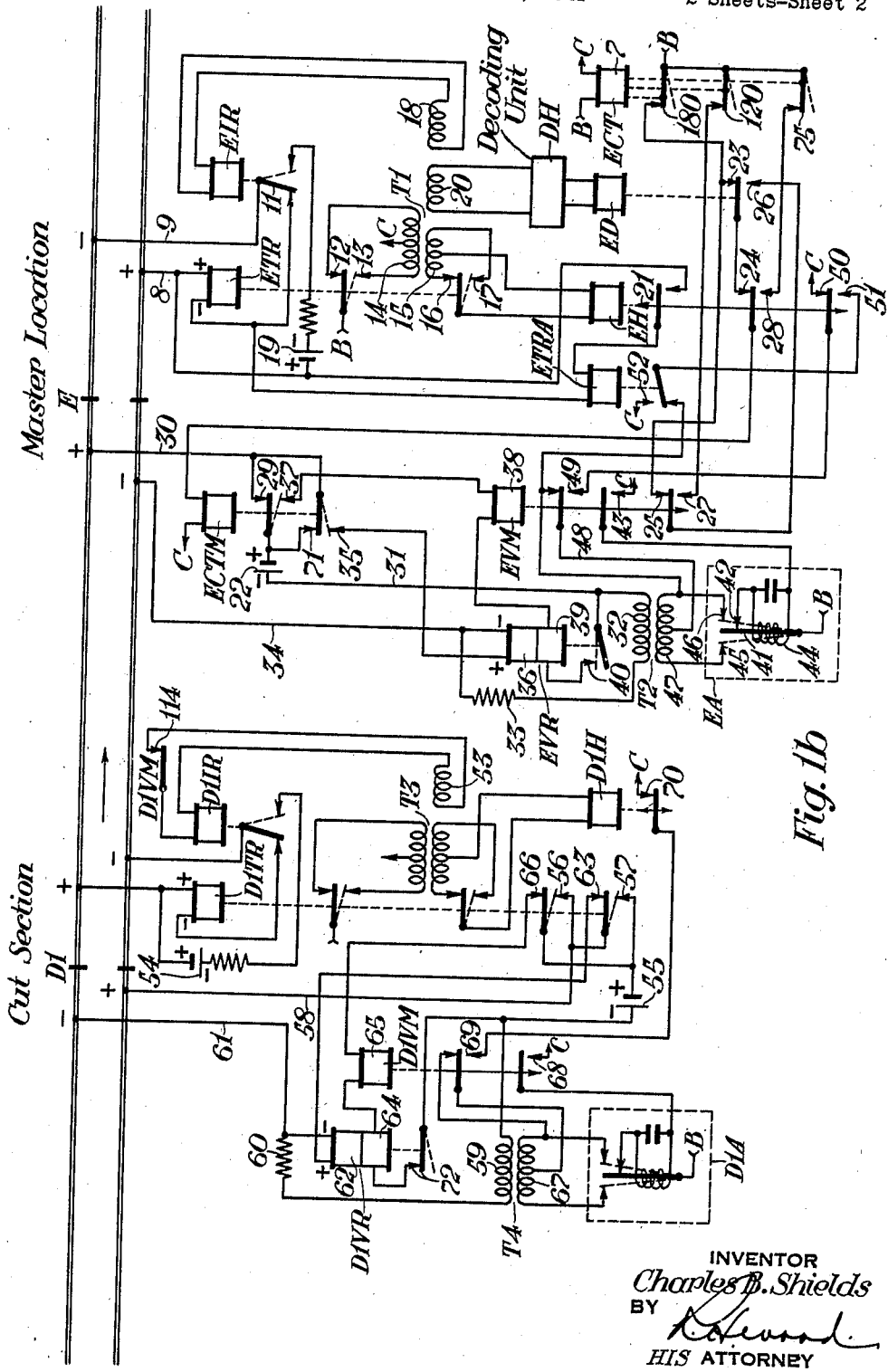

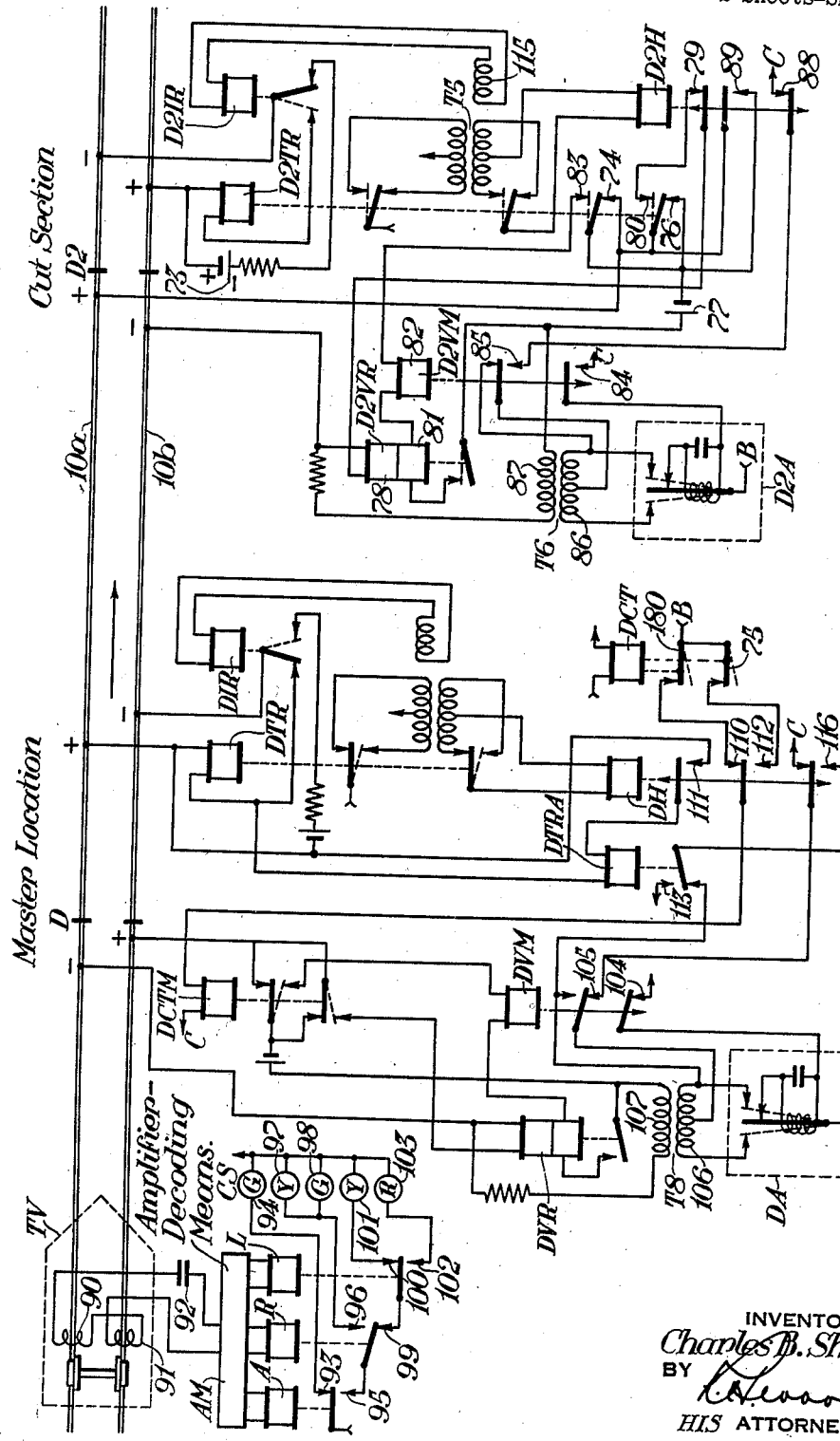

May 5, 1942.

C. B. SHIELDS 2,281,957

RAILWAY TRAFFIC CONTROLLING APPARATUS

Filed March 19, 1941

2 Sheets-Sheet 2

INVENTOR
Charles B. Shields
BY
HIS ATTORNEY

Patented May 5, 1942

2,281,957

UNITED STATES PATENT OFFICE 2,281,957

RAILWAY TRAFFIC CONTROLLING APPARATUS

Charles B. Shields, Petersburg, Va., assignor to The Union Switch and Signal Company, Swissvale, Pa., a corporation of Pennsylvania Application March 19, 1941, Serial No. 384,105

7 Claims. (Cl. 246—63)

My invention relates to railway traffic controlling apparatus, and more particularly to trackway apparatus for cab signal systems.

Cab signals without wayside signals are sometimes provided and in some instances such cab signal systems rely upon local batteries along the trackway as a source of power so as to be entirely free from line wires which may be destroyed by storms. The traffic controlled trackway apparatus includes track circuits using coded direct current but for control of the cab signal coded alternating current is used, such alternating current being derived from the batteries through the means of tuned alternators. Both currents are coded by being periodically interrupted and a code consists of alternate on and off periods of current. Coded direct current is normally applied to the track circuit for control of the trackway apparatus and coded alternating current is supplied to the track circuit through the medium of approach control apparatus for control of the cab signal. It has been proposed for such systems to provide only two different proceed signal indications for the cab signal, and to use relatively long track sections or blocks by subdividing each block into subsections. For example, each block may be two miles or more in length and arranged in two or three subsections. The junction of two blocks is made a master control location and the control effected for the block to the rear of such junction location may be different from that in force for the block immediately in advance of such location. At each cut-section location the control in force in the subsection in advance is repeated for the subsection next to the rear. That is to say, at the entrance end of each block the control effected by the trackway apparatus may change but no change in the control occurs normally at a cut-section location with the result that the same control condition ordinarily prevails throughout all the subsections of a block.

Two different proceed cab signal indications and such length and arrangement of a block are satisfactory in general, however, there may be locations of a railroad where an additional proceed cab signal indication is desirable.

In view of such circumstances in cab signal systems of the character described above, a feature of my invention is the provision of novel railway traffic controlling apparatus for cab signal systems of the type here contemplated wherewith an additional proceed cab signal indication is effected at a preselected location.

Again, a feature of my invention is the provision of novel means for a two-block three-indication cab signal system wherewith a fourth cab signal indication is effected at certain preselected places.

Again, a feature of my invention is the provision of trackway apparatus incorporating simple and inexpensive means which is operative to provide an additional cab signal control at a preselected location without requiring any additional control condition of the trackway apparatus.

The above features of my invention, together with other advantages which will become apparent as the specification progresses are attained according to my invention by providing the trackway apparatus at a preselected location with an additional code forming circuit which is effective to supply alternating current coded at a particular code rate different from the code rates normally used by the system. Such additional code forming circuit is so governed by the approach control relays of the system that it is made active only when a train is approaching the location at which such circuit is provided. Hence such code forming circuit is active to cause alternating current coded at the particular rate to be applied to the track circuit for control of the cab signal apparatus, but it is inactive and non-effective when the block is unoccupied.

I shall describe one form of apparatus embodying my invention, and shall then point out the novel features thereof in claims.

In the accompanying drawings, Figs. 1a and 1b when taken together with Fig. 1a placed at the left, are diagrammatic views showing one form of apparatus embodying my invention when used with a two-block three-indication cab signal system having blocks which are arranged with three subsections.

Referring to Figs. 1a and 1b, the reference characters 10a and 10b designate the track rails of a stretch of railway over which traffic normally moves in the direction indicated by arrows and which rails are formed by the usual insulated rail joints into consecutive blocks of which only the one full block D—E and the adjacent ends of the adjoining blocks are shown since these are sufficient for a full understanding of my invention. The block D—E is subdivided by the usual insulated rail joints into three subsections D—D2, D2—D1 and D1—E. That is, block D—E is arranged with two cut-section locations D2 and D1. As will appear hereinafter, locations D and E are master control locations and cut-section locations D1 and D2 are repeater locations. The block D—E is provided with trackway apparatus for establishing different control conditions for that block, and in accordance with customary practice the trackway apparatus for block D—E is governed by the trackway apparatus for the block next in advance and in turn governs the apparatus for the block next in the rear. Hence a portion of the apparatus shown at location E is associated with the block next in advance and a portion is associated with the block D—E, and in like manner a portion of the apparatus shown at location D is associated with the block D—E and the remaining portion is associated with the block next in the rear.

Such trackway apparatus uses coded direct current track circuits and each subsection is provided with a track circuit including a source of coded direct current connected to the rails at the exit end of the subsection and a code following track relay connected to the rails at the entrance end of the subsection. Since but two proceed indication controls are provided the direct current is coded at one or another of two different code rates according to two different traffic conditions in advance and I shall assume that the code rates of 180 and 75 interruptions per minute are used, the code rate of 180 reflecting clear traffic conditions, and the code rate of 75 reflecting approach traffic conditions. In accordance with standard practice the absence of coded current reflects a low speed traffic condition. It will be understood of course that my invention is not limited to such code rates and that such code rates are used for illustration since these code rates are those in general use. Also, it is to be understood that my invention is not limited to a two-block three-indication cab signal system but such application is used to show the many places where apparatus embodying my invention is useful.

The code following track relay for each track circuit controls decoding means responsive to the above-mentioned code rates and such decoding means in turn governs the apparatus of the track circuit next to the rear.

Approach control apparatus is associated with each track circuit and such apparatus is responsive to a train entering the associated track circuit to cause alternating current to be supplied to the rails of that particular track circuit for controlling cab signal apparatus. Hence the trackway apparatus at each location includes a code following track relay for the track circuit in advance, decoding means controlled by such track relay, a source of current for supplying coded direct current to the track circuit in the rear of that location, a source of alternating current, and approach control means associated with such track circuit in the rear for supplying to the rails coded alternating current from the alternating current source when a train enters the associated section.

Looking at location E of Fig. 1b, a code following track relay ETR, an impulse relay EIR, decoding relays EH and ED, and a relay ETRA are associated with the track circuit for the subsection immediately in advance of location E, that is, immediately to the right of location E as viewed in the drawings. The apparatus for supplying coded direct current to such track circuit is not shown and is similar to corresponding apparatus for the track circuit of subsection D1—E shortly to be described. Track relay ETR is connected across the rail over wires 8 and 9, a contact member 11 of relay EIR being interposed in wire 9. Track relay ETR is a direct current relay and hence is operated in step with the on and off periods of the coded direct current supplied to the track circuit but is non-responsive to coded alternating current. Relay ETR when operated to alternately close front and back contacts 12 and 13 causes direct current from a source whose terminals are indicated at B and C to be alternately supplied to the two portions of primary winding 14 of a decoding transformer T1 with the result that an alternating electromotive force is induced in secondary winding 15 of transformer T1. Secondary winding 15 is connected to decoding relay EH over front and back contacts 16 and 17 of relay ETR and such electromotive force is rectified and relay EH is energized by unidirectional current, decoding relay EH being effectively energized and picked up when relay ETR is operated at either the 75 or the 180 code rate.

Relay EIR is connected to a secondary winding 18 of transformer T1 for energization of that relay by the electromotive force induced in secondary winding 18 due to operation of track relay ETR. Relay EIR is a polar relay whose contact member 11 is biased to seek the normal left-hand position when the relay is deenergized as well as being held in that position when the relay is energized at normal polarity. When relay EIR is energized at reverse polarity, its contact member 11 is moved to the reverse right-hand position. The connections of secondary winding 18 to relay EIR are such that when track relay ETR is picked up at the start of each on code period of the rail current the electromotive force induced in secondary winding 18 causes relay EIR to be energized at normal polarity, but that when relay ETR is released at the end of each on code period, the electromotive force induced in secondary winding 18 causes relay EIR to be energized at reverse polarity moving its contact member 11 to the reverse position. This electromotive force of reverse polarity dies away during the off code period so that relay EIR becomes deenergized and its contact member 11 is moved back to the normal position by the biasing element of the relay before the start of the next on code period of the rail current. Relay EIR when reversed disconnects track relay ETR from the rails and connects a battery 19 thereto. Thus during a portion of each off period of the track circuit current polar relay EIR is reversed and current is supplied to the rails from battery 19. This current supplied by battery 19 to the rails during each off code period flows in the rails from the entrance end to the exit end of the track circuit and functions as an approach control current in a manner to later be described.

According to my invention location E is selected as a location at which an additional cab signal control is to be effected and to that end decoding transformer T1 is provided with another secondary winding 20 to which decoding relay ED is connected through a decoding unit DH. Decoding unit DH may be any one of several types and it is sufficient for this application to point out that when the electromotive force induced in secondary winding 20 is of the frequency corresponding to operation of relay ETR at the 180 code rate, decoding relay ED is effectively energized and picked up but that relay ED is not picked up when relay ETR is operated at the 75 code rate.

The relay ETRA is connected across the rails in parallel with relay ETR when relay EH is released to close its back contact 21, such connection being readily understood by an inspection of the drawings. The function of relay ETRA will be made clear when the operation of the apparatus is described.

At location E, the decoding relay EH governs the means by which coded direct current is supplied to the track circuit for subsection D1—E, and which supply means includes a battery 22, a coder ECT and a coding relay ECTM. The coder ECT may be any one of several types well known to the art and as here shown it is of the relay type having contact members 75, 180 and 120 which are operated as long as the operating winding 7 of the coder is effectively energized, contact member 75 being operated at the rate of 75 times per minute, contact member 120 at the rate of 120 times per minute and contact member 180 at the rate of 180 times per minute. The operating winding 7 of coder ECT is preferably connected permanently to the current source and hence is normally active.

Coding relay ECTM is a direct current relay and when picked up completes a connection by which battery 22 is connected across the rails, such connection extending from positive terminal of battery 22 over front contacts 29 and 71 in multiple of relay ECTM and wire 30 to rail 10a, and from the negative terminal of battery 22 over wire 31, a secondary winding 32 of transformer T2, to be later referred to, resistor 33 and wire 34 to rail 10b. Hence operation of relay ECTM to alternately open and close contact members 29 and 71 is effective to code the direct current supplied by battery 22 to the track rails. Relay ECTM is controlled by the contact members of the coder ECT over one or another of several circuit paths. A first circuit path may be traced from terminal B of the current source over contact member 180 of coder ECT, front contacts 23 and 24 of relays ED and EH, respectively, winding of relay ECTM and terminal C of the current source, and relay ECTM is operated at the code rate of 180 times per minute with the result that the direct current supplied by battery 22 to the associated track circuit of subsection D1—E is coded at the same 180 code rate. A second circuit path can be traced from terminal B over code contact member 180, front contact 25 of a relay EVM to be referred to, back contact 26 of relay ED, and thence as traced for the first circuit path, and relay ECTM again is operated at the 180 code rate to code at the same rate the current supplied from battery 22 to its associated track circuit. A third circuit path includes terminal B, contact member 75 of coder ECT, back contact 28 of relay EH, winding of relay ECTM and terminal C, and relay ECTM is operated at the 75 code rate to code at the same rate the current supplied by battery 22 to the track circuit of subsection D1—E. According to my invention, a fourth and additional code forming circuit path is provided for operating relay ECTM and which circuit path extends from terminal B over contact member 120 of coder ECT, back contact 27 of relay EVM, back contact 26 of relay ED, front contact 24 of relay EH, and winding of relay ECTM to terminal C, and relay ECTM is operated at the 120 code rate. It is to be seen therefore that relay ECTM is operated at either the 180 or 75 code rate to code the direct current for the track circuit of the section to the rear of location E according as decoding relay EH associated with the track circuit next in advance of location E is picked up or released, and is operated at times at the 120 code rate. The function of operating relay ECTM at the 120 code rate will appear hereinafter.

Relay ECTM in addition to coding the direct current supplied to the track circuit of subsection D1—E also governs the connection of an approach control relay EVR to the track rails of that subsection. When relay ECTM is released to close back contact 35, a top winding 36 of relay EVR is connected to the rails, the connection extending from the left-hand terminal of winding 36 over back contact 35 and wire 30 to rail 10a, and from the right-hand terminal of winding 36 over wire 34 to rail 10b. Consequently, during each off period of the track circuit current relay EVR is connected across the rails for energization of relay EVR by approach control current supplied to the rails at the entrance end of subsection D1—E in the same manner as that by which approach control current is supplied by battery 19 to the rails over the reverse position of relay EIR during each off period of the track circuit current for the track circuit in advance of location E. With approach relay EVR picked up to close its front contact 40, a local circuit is prepared by which current is supplied from battery 22 to a lower winding 39 of relay EVR in series with another approach control relay EVM, the circuit extending from positive terminal of battery 22 over back contact 37 of relay ECTM, winding 38 of relay EVM, lower winding 39 of relay EVR, front contact 40 and wire 31 to the negative terminal of battery 22. It follows that when relay ECTM is operated at either the 75 or 180 code rate, approach relay EVR is connected to the rails each off code period for energization of the relay by approach control current, and in the event such approach control current is present relay EVR is picked up, after which the associated local circuit is formed by which relays EVR and EVM are energized in series. Relay EVR is of the usual acting type and relay EVM is slow releasing in character, and hence when relay ECTM is picked up to open back contact 37 at the next on period of the code, relay EVR is released but relay EVM remains picked up, its slow release period being sufficient to bridge the on code period.

Approach control relays EVR and EVM control the means by which alternating current is supplied to the track rails to control cab signal apparatus of a train occupying subsection D1—E. Alternating current may be derived from any convenient source and in this instance it is derived from a local battery through a tuned alternator or vibrator EA and transformer T2. An operating winding 44 of vibrator EA is connected over its own armature 41 and contact 42 to a suitable source of direct current, such as the current source whose terminals are indicated at B and C, such operating circuit including back contact 43 of relay EVM. Hence armature 41 is caused to vibrate as long as operating winding 44 is supplying the current, the rate of vibration being predetermined by the proportion of the parts. Armature 41 when vibrated alternately engages contacts 45 and 46 to complete a circuit by which current from the source of direct current is alternately supplied to the two portions of primary winding 47 of transformer T2. This circuit can be traced from terminal B over armature 41, either contact 45 and the left-hand portion of winding 47 to a center terminal, or contact 46 and the right-hand portion of winding 47 to the center terminal, and thence over wire 48, back contact 49 of relay EVM and front contact 50 of relay EH to terminal C. When the condition is such that decoding relay EH is released this circuit for primary winding 47 may be completed over back contact 51 of relay EH and front contact 52 of relay ETRA to terminal C. With relay EVM released to complete the operating circuit of alternator EA and to complete the circuit by which current is supplied to primary winding 47 of transformer T2, an alternating electromotive force is induced in secondary winding 32 of transformer T2. The parts are so proportioned that the alternating electromotive force is of a predetermined frequency of say, for example, 100 cycles per second. It will be recalled that secondary winding 32 of transformer T2 is included in the circuit connection by which battery 22 is connected across the rails and consequently alternating current is supplied to the rails when relay EVM is released. Such alternating current is coded by the operation of relay ECTM the same as the direct current supplied by battery 22. Normally, that is, when relay EVM is picked up, the alternator EA is inactive and no alternating current is created in secondary winding 32.

Looking at cut-section location D1, a code following track relay D1TR is connected to the rails and controlled by the coded direct current supplied to the track circuit at location E in the manner just explained. Track relay D1TR is similar to track relay ETR and controls a decoding relay D1H through a decoding transformer T3 in the same manner that track relay ETR controls decoding relay EH through decoding transformer T1 and the description need not be repeated. A polar relay D1IR similar to relay EIR is associated with track relay D1TR and relay D1IR is controlled by the electromotive force induced in secondary winding 53 of transformer T3 due to the operation of relay D1TR, relay D1IR being energized at reverse polarity to operate the relay to the reverse position each time the track relay D1TR is released. Relay D1IR when reversed during each off period of the track circuit current connects a battery 54 to the track rails to supply approach control current which is effective to energize the top winding 36 of approach relay EVR, it being recalled that winding 36 is connected to the rails over back contact 35 of coding relay ECTM each off period of the code. It is to be observed that a front contact 114 of an approach relay D1VM, to be later described, is interposed in the connection of secondary winding 53 to relay D1IR, front contact 114 being shown remote from the winding of relay D1VM for the sake of simplicity. It is to be seen therefore that during each on period of relay ECTM current is supplied to the track circuit of subsection D1—E from battery 22 at the exit end of the section to operate code following relay D1TR and during each off period of the code, battery 54 at the entrance end of the section is connected to the rails due to the operation of relay D1IR to supply to the track rails approach control current which is effective to energize approach relay EVR and in turn control the other approach relay EVM.

At cut-section location D1, track relay D1TR controls the supply of current from a track battery 55 to the track circuit of subsection D2—D1. the circuit connection being completed at back contacts 56 and 57 of relay D1TR each off period of the code for the track circuit of section D1—E. To be explicit, such connection extends from the positive terminal of battery 55 over back contacts 56 and 57 in multiple and wire 58 to rail 10b, and from the negative terminal of battery 55 over secondary winding 59 of a transformer T4, resistor 60, and wire 61 to rail 10a. It is clear, therefore, that the track circuit of subsection D2—D1 is supplied with direct current coded at the same rate as the track circuit current of subsection D1—E.

Two approach control relays D1VR and D1VM are provided for the apparatus at cut-section D1 and these relays are associated with the track circuit of subsection D2—D1 in substantially the same manner as the approach control relays EVR and EVM are associated with the track circuit of subsection D1—E. A top winding 62 of relay D1VR is connected across the rails over front contact 63 of relay D1TR during each off period of the track circuit current of subsection D2—D1 for energization of relay D1VR by approach control current supplied to the rails at the entrance end of this subsection. Lower winding 64 of relay D1VR and winding 65 of relay D1VM are included in a local circuit which is connected to battery 55 over front contact 66 of relay D1TR and front contact 72 of relay D1VR.

A tuned alternator D1A and transformer T4 serve as a source of alternating current for subsection D2—D1, such current source being controlled by the approach relay D1VM. The operating circuit for alternator D1A is completed at back contact 68 of relay D1VM, and the circuit for supplying current to primary winding 67 of transformer T4 is completed at back contact 69 of relay D1VM in series with front contact 70 of decoding relay D1H. Since secondary winding 59 of transformer T4 is included in the connection of track battery 55 to the rails, alternating current coded at the rate at which the track relay D1TR is operated is supplied to the rails of subsection D2—D1 at such time as approach relay D1VM is released.

Consequently the apparatus at cut-section location D1 is operated normally to repeat the code of the track circuit of section D1—E for the track circuit of subsection D2—D1, to supply approach control current to the rails of subsection D1—E each off period of the track circuit current of that subsection and to superimpose at times alternating current on the coded direct current of the track circuit of subsection D2—D1. It is to be observed that when track relay D1TR is shunted and released closing back contacts 56 and 57, non-coded direct current is supplied by battery 55 to the track circuit of subsection D2—D1. Also, that at such time as decoding relay D1H is released opening front contact 70 the source of alternating current is ineffective.

The apparatus at cut-section location D2 is substantially the same as that at cut-section location D1. Code following track relay D2TR for the track circuit of subsection D2—D1 controls through a decoding transformer T5, a decoding relay D2H and a polar relay D2IR, polar relay D2IR being reversed during each off code period due to the electromotive force induced in secondary winding 115 of transformer T5. Relay D2IR when reversed disconnects track relay D2TR from the rails and connects battery 73 thereto for supplying approach control current for energizing the approach relay D1VR at location D1. It is to be observed that the connection of relay D2IR to transformer secondary winding 115 includes no approach control relay contact as is the case of relay D1IR at cut-section location D1. Track relay D2TR at back contacts 74 and 76 in multiple, completes a connection by which a track battery 77 is connected to the rails of subsection D—D2 for supplying coded direct current to he rails of subsection D—D2. Top winding 78 of approach control relay D2VR is connected to the rails of subsection D—D2 over front contact 79 of decoding relay D2H and front contact 80 of relay D2TR, and lower winding 81 of relay D2VR in series with winding 82 of relay D2VM are energized over a local circuit including battery 77 and front contact 83 of relay D2TR. Relay D2VM when released to close back contacts 84 and 85 completes circuits for causing operation of alternator D2A and for supplying current to primary winding 86 of a transformer T6 so that an alternating electromotive force is created in secondary winding 87 of transformer T6 and alternating current is superimposed on the track circuit of subsection D—D2, the circuit for primary winding 86 being also controlled at front contact 88 of decoding relay D2H. It is also to be pointed out that at location D2, non-coded current is supplied to the track section D—D2 from track battery 77 at such time as decoding relay D2H is released to close back contact 89. Thus when track relay D1TR at location D1 is released so that non-coded current is supplied to the track circuit of subsection D2—D1 and track relay D2TR is held steadily energized thereby, decoding relay D2H is released and noncoded direct current is supplied to the track circuit of subsection D—D2. It is to be observed, therefore, that at the cut-section location D2 the code for the track circuit for the subsection D—D1 is repeated for the track circuit for the subsection D—D2 and the code for the alternating current supplied when approach relay D2VM is released is the same as the code for the direct current.

At master location D the trackway apparatus is similar to that at master location E except for the fact that location D is not a location selected for providing an additional cab signal control and the apparatus includes no decoding unit and decoding relay responsive only to the 180 code rate of the track circuit current, nor is there any additional code forming circuit for providing an additional code of the alternating current. That is, the apparatus at location D is that generally provided at master locations and such apparatus will be readily understood by an inspection of Fig. 1a in the light of the description of the apparatus at location E.

At the left-hand end of Fig. 1a a train shown conventionally at TV is provided with cab signal apparatus. Such cab signal apparatus includes a pair of inductors 90 and 91 mounted on the train ahead of the leading pair of wheels in inductive relation to rails 10a and 10b, respectively. In accordance with usual practice inductors 90 and 91 are connected together so that electromotive forces induced therein due to current flowing in the rails in opposite directions at any given instant add their effects. Inductors 90 and 91 are included in a receiving circuit that also includes a condenser 92 and such receiving circuit is tuned to resonance at the frequency of the alternating current supplied to the rails and in the case here assumed such receiving circuit is tuned to resonance at 100 cycles per second. The train carried receiving circuit is connected to an amplifier decoding means AM, the amplifier decoding means AM being of any of the standard forms in present day use and being shown conventionally for the sake of simplicity. Such means may be, for example, that disclosed in the Letters Patent of the United States No. 1,773,515, granted August 19, 1930, to C. C. Buchanan for Railway traffic controlling apparatus. It is sufficient for this application to point out that three decoding relays A, R and L are selectively controlled according to the code rate of the alternating current picked up from the track rails, the arrangement being that relay A is effectively energized and picked up only for alternating current of the 180 code rate, relay R is effectively energized and picked up for alternating current of the 120 code rate and relay L is effectively energized and picked up for alternating current of either the 75 or 120 or 180 code rate. Relays A, R and L are used to govern operating circuits of a cab signal CS capable of displaying four different signal indications. Relay A when picked up in response to alternating current of the 180 code rate to close front contact 93 forms an operating circuit for lamp 94 of signal CS and that lamp is illuminated to display a green light for a clear signal indication. When relay R is picked up and A is released in response to alternating current of the 120 code rate, an operating circuit including back contact 95 of relay A and front contact 96 of relay R is formed for lamps 97 and 98 of signal CS in multiple and these lamps are illuminated to display a yellow light over a green light as an approach-medium signal indication. When relay L is picked up and relays A and R are released in response to alternating current of the 75 code rate an operating circuit including back contacts 95 and 99 of relays A and R, respectively, and front contact 100 of relay L is formed for lamp 101 of signal CS and that lamp is illuminated to display a yellow light for an approach signal indication. Again, when no coded alternating current flows in the rails, all three relays A, R and L are released and an operating circuit including back contacts 95, 99 and 102 of relays A, R and L, respectively, is formed for lamp 103 of signal CS and that lamp is illuminated to display a red light as a slow speed signal indication.

In describing the operation of the apparatus, I shall first assume that block D—E is unoccupied and the train TV is operating in the subsection immediately to the rear of location D. Under such circumstances direct current of either the 75 or 180 code rate is applied to the track circuits of the subsections of block D—E so that decoding relay DH at location D is picked up and relay DCTM is operated at the 180 code rate over a circuit completed at front contact 110 of relay DH and the 180 code contact member of coder DCT. The train TV shunts approach relay DVR causing that relay along with approach relay DVM to be released. The closing of back contact 104 of relay DVM closes the operating circuit for alternator DA, and alternator DA is rendered active. The release of relay DVM to close back contact 105 completes the circuit for primary winding 106 of transformer T8 so that an alternating electromotive force is induced in secondary winding 107 of transformer T8 and alternating current coded at the 180 code rate is supplied to the track rail of the section to the rear of location D with the result a clear cab signal indication is established on the train TV.

I shall next assume that the second block in advance of block D—E is occupied and both the block next in advance of block D—E and block D—E are unoccupied, and that the train TV moves to the right past location D into subsection D—D2. Under such circumstances the 75 code is provided for the track circuit of the subsection for the block next in advance of block D—E and the 180 code is provided for the track circuits of the subsections of block D—E. With the train in subsection D—D2, the approach relay D2VR is shunted causing the release of relay D2VR as well as the release of relay D2VM. When relay D2VM is released to close back contacts 84 and 85, operation of alternator D2A is effected and current is supplied to primary winding 87 of transformer T6 and alternating current is applied to the rails of the subsection D—D2, the code for the alternating current being the 180 code rate because the track relay D2TR is operated at the 180 code rate. Consequently a clear cab signal indication is established on train TV in the subsection D—D2.

Assuming again that the traffic conditions in advance of block D—E remain the same as above considered and that train TV moves to the right to enter subsection D2—D1, an approach-medium cab signal is effected on the train. It is to be recalled that it has been assumed that the second block in advance of block D—E is occupied, and location E is a location selected for providing the additional apparatus embodying the invention for establishing an additional cab signal indication. When the train enters subsection D2—D1 and shunts approach control relay D1VR, that relay is released to be followed by the release of relay D1VM. The release of relay D1VM causes the operation of alternator D1A and the generation of alternating current thereby. The release of relay D1VM to open front contact 114 interposed in the circuit of relay D1IR causes relay D1IR to remain inactive at its left-hand position with the result that no approach control current is provided for the subsection D1—E and approach relays EVR and EVM are subsequently released. The release of relay EVM causes code forming relay ECTM at location D to be operated over the circuit including code contact member 120 of coder ECT, back contact 27 of relay EVM, back contact 26 of relay ED and front contact 24 of relay EH. With relay ECTM operated at the 120 code rate then the direct current supplied to the track circuit of subsection D1—E is coded at a corresponding rate causing track relay D1TR to be operated at the 120 code rate with the result that the alternating current supplied to the rails of subsection D2—D1 is coded at the 120 code rate and an approach-medium cab signal is effected for the train in subsection D2—D1. It is to be noted that operation of track relay D1TR at the 120 code rate causes decoding relay D1H to be energized and picked up the same as if relay D1TR were operated at either the 75 code rate or the 180 code rate.

It should be pointed out that in case the front contact 114 of relays D1VM at subsection location D1 is not included in the connection of relay D1IR, then a clear cab signal indication would be effected for the train traversing subsection D2—D1 under the above assumed traffic conditions in advance because in the case front contact 114 is omitted no change is effected in the condition of the apparatus at location E and track relay D1TR at location D1 would be operated at the 180 code rate to code at that rate the alternating current supplied to the rails of subsection D2—D1.

Again assuming that the traffic conditions in advance of block D—E remain the same as assumed hereinbefore and that the train TV moves to the right to enter subsection D1—E, an approach-medium cab signal indication is continued. The train in subsection D1—E shunts approach relay EVR so that approach relay EVM is also released and the special circuit for operating relay ECTM at the 120 code rate is completed causing the alternating current supplied to the rails of subsection D1—E to be coded at the 120 code rate for effecting the approach-medium cab signal indication. It is to be noted that in the case front contact 114 of relay D1VM is omitted then the shift in the code rate of operating code forming relay ECTM at location D from 180 code rate to 120 code rate is effected when the train enters subsection D1—E to shunt approach relay EVR, this shift in the code rate of operating relay ECTM being effected in the manner described hereinbefore. While the train occupies the subsection D1—E, track relay D1TR is released and is inactive and non-coded direct current is applied to subsection D2—D1 causing track relay D2TR to be energized and picked up but inactive so that decoding relay D2H is released. With relay D2H released closing back contact 89 non-coded direct current is supplied to the track circuit of subsection D—D2 with the result that its track relay DTR is energized but inactive causing decoding relay DH to be released with the result that direct current of the 75 code rate is supplied to the track circuit for the subsection to the rear of location D.

At location D, a relay DTRA similar to relay ETRA at location E is connected across the rails in parallel with track relay DTR when decoding relay DH is released to close back contact 111. Consequently, relay DTRA is energized and picked up at such times as non-coded current is supplied to the track circuit of subsection D—D2 because the train TV occupies either subsection D2—D1 or D1—E. If a second train moves into the subsection to the rear of location D when non-coded current is supplied to the track circuit of subsection D—D2 because of the train TV in subsection D2—D1 or D1—E, coded alternating current is provided for the subsection to the rear of location D for controlling the cab signal of such second train due to the control effected by relay DTRA. Under such conditions code forming relay DCTM is operated at the 75 code rate by a circuit including back contact 112 of relay DH and the 75 code contact member of coder DCT. With approach relay DVM released due to the second train alternator DA is made active and the circuit for primary winding 106 of transformer T8 is completed at back contact 105 of relay DVM, back contact 116 of relay DH, and front contact 113 of relay DTRA. Thus alternating current of the 75 code rate is supplied to the rails for control of the cab signal of this second train. The relay ETRA at location E functions in a manner similar to that of relay DTRA.

It is apparent from an inspection of Figs. 1a and 1b that one of the cut-section locations D2 or D1 may be omitted and block D—E arranged with only two subsections and that under such arrangement the operation of the apparatus will be substantially the same as that described in connection with the arrangement shown in Figs. 1a and 1b where block D—E is arranged with three subsections. In the event block D—E is arranged with only two subsection locations, location E may be selected as the location for providing the additional code forming circuit embodying my invention and when such code forming circuit is provided then an additional cab signal indication will be effected when the train occupies the subsection to the rear of such selected location.

It is to be seen therefore that I have provided novel and inexpensive means for providing an additional fourth cab signal indication at selected locations of a two-block three-indication cab signal system.

The advantage of such an arrangement is due to the fact that a restrictive proceed cab signal indication less restrictive than the approach indication can readily be provided at selected locations, such as, for example, in the vicinity of an interlocking of a normal three-indication cab signal system with but little additional equipment and such additional indication can be made to become effective at a cut-section location.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. In railway traffic controlling apparatus for use with train carried cab signal equipment responsive to coded alternating current flowing in the rails, the combination comprising, a block the rails of which are formed into a plurality of subsections, trackway apparatus for said block controlled by traffic conditions in advance of said block, said trackway apparatus including a track circuit for each of said subsections and each of which track circuits is supplied with coded direct current, said direct current coded at a first or a second code rate according to a first or a second traffic condition in advance of said block, approach control means for each subsection including a source of alternating current and responsive to a train entering the subsection for supplying to the rails of that subsection alternating current coded at the same code rate as the direct current then supplied to the associated track circuit, and means for a selected one of said subsections controlled by the approach control means of that subsection under a preselected condition of the trackway apparatus to cause the alternating current supplied to the rails of that subsection to be of a code rate different from the code rate of the direct current just prior to the train entering that subsection.

2. In railway traffic controlling apparatus for use with train carried cab signal equipment responsive to coded alternating current flowing in the rails, the combination comprising, a block the rails of which are formed into a plurality of subsections, trackway apparatus for said block controlled by traffic conditions in advance of said block, said trackway apparatus including a track circuit for each of said subsections and each of which track circuits uses coded direct current, said direct current coded at a first or a second code rate according to a first or a second traffic condition in advance of said block, a source of alternating current for each subsection normally ineffective, approach control means for each subsection responsive to a train entering the subsection for rendering the associated alternating current source effective, said alternating current source of a subsection when effective supplying to the rails of that subsection alternating current coded at the same code rate as the direct current thus supplied to the associated track circuit, and means for a selected one of said subsections controlled by said trackway apparatus under preselected traffic conditions in advance of said block for causing the alternating current supplied to the rails of that subsection to be of a code rate different from the code rate of the direct current just prior to the train entering such subsection.

3. In a railway traffic controlling apparatus for use with train carried cab signal equipment responsive to coded alternating current flowing in the rails, the combination comprising, a block the rails of which are formed into a plurality of subsections, trackway apparatus for said block controlled by traffic conditions in advance of said block, said trackway apparatus including a track circuit for each of said subsections and each of which track circuits uses coded direct current, said direct current coded at a first or a second code rate according to a first or a second traffic condition in advance of said block, a source of alternating current for each subsection normally ineffective, approach control means for each subsection responsive to a train entering the subsection for rendering the associated alternating current source effective, said alternating current source of a subsection when effective supplying to the rails of that subsection alternating current coded at the same code rate as the direct current thus supplied to the associated track circuit, and means for a selected one of said subsections controlled by said trackway apparatus under preselected traffic conditions in advance of said block for causing the alternating current supplied to the rails of that subsection to be of a predetermined code rate which is different from said first and second code rates.

4. In railway traffic controlling apparatus for use with train carried cab signal equipment responsive to coded alternating current flowing in the rails, the combination comprising, a block the rails of which are formed into a plurality of subsections, trackway apparatus for said block controlled by traffic conditions in advance of said block, said trackway apparatus including a track circuit for each of said subsections and each of which track circuit uses coded direct current, said direct current coded at a first or a seond code rate according to a first or a second traffic condition in advance of said block, a source of direct current for each subsection, supply means for each subsection operative when connected to said direct current source to generate alternating current and superimpose such alternating current on the coded direct current supplied to the associated track circuit, approach control means for each subsection to control the connection of said supply means and effective to connect said supply means to said direct current source when a train enters the respective subsection, and a special code forming circuit for a selected one of said subsections to shift the code rate for the currents supplied to the rails of that subsection to a code rate different from said first and second code rates when a train enters said selected subsection.

5. In a railway traffic controlling apparatus for use with train carried cab signal equipment responsive to coded alternating current flowing in the rails, the combination comprising, a block the rails of which are formed into a plurality of subsections, a track circuit for each such subsection and including a source of coded direct current and a code following direct current track relay, means responsive to traffic conditions in advance of said block to code the direct current of the track circuit for the most advanced subsection at a first or a second code rate, each such track relay at the cut-section locations effective to code the direct current of the track circuit to the rear at the same rate as that at which that relay is operated, a normally inactive source of alternating current for each subsection of the block, approach control means for each subsection responsive to a train entering the respective subsection to render the associated alternating current source active and effective to superimpose alternating current on the coded direct current supplied to the track circuit of the respective subsection, and a special code forming circuit controlled by traffic conditions in advance of said block to shift the code rate for the currents applied to the rails of the most advanced subsection to a distinctive third code rate when a train enters the most advanced subsection.

6. In railway traffic controlling apparatus for use with train carried cab signal equipment responsive to coded alternating current flowing in the rails, the combination comprising, a block the rails of which are formed into three subsections, a track circuit for each such subsection and including a source of coded direct current and a direct current code following track relay, means responsive to a first and a second traffic condition in advance of said block to cause the direct current of the track circuit for the subsection adjacent the exit end of the block to be coded at a first and a second code rate respectively, each such track relay at the cut-section locations effective to code the direct current of the track circuit next to the rear at the same rate as that at which the relay is operated, a source of alternating current for each subsection of the block, approach control means for each such subsection responsive to a train entering the respective subsection to cause current from the respective alternating current source to be supplied to the rails of that subsection coded at the rate at which the track relay for the subsection next in advance is being operated, and other means controlled by the approach control means for the second subsection from the entrance end of the block to shift the rate at which the track relay for the subsection adjacent the exit end of the block is operated to a third rate when said second traffic conditions exist in advance of said block.

7. In railway traffic controlling apparatus for use with train carried cab signal equipment responsive to coded alternating current flowing in the rails, the combination comprising, a block the rails of which are formed into three subsections, a track circuit for each subsection and including a source of coded direct current and a direct current code following track relay, means responsive to a first and a second traffic condition in advance of said block to cause the direct current of the track circuit for the subsection adjacent the exit end of the block to be coded at a first and a second code rate respectively, each such track relay at the cut-section locations effective to code the direct current of the track circuit next to the rear at the same rate as that at which the relay is operated, a source of alternating current for each subsection, approach control means for each subsection responsive to a train entering the respective subsection to cause current from the respective alternating current source to be supplied to the rails of that subsection coded at the rate at which the track relay for the subsection next in advance is being operated, a special code forming circuit effective when connected to the track circuit for the subsection adjacent the exit end of the block to code the current supplied to the rails from both direct and alternating current source at a third code rate, and means controlled by the approach control means for the intermediate subsection to connect such special code forming circuit to the associated track circuit.

CHARLES B. SHIELDS.